United States Patent [19]

Loqvist

[11] Patent Number: 4,710,069

[45] Date of Patent: Dec. 1, 1987

[54] CUTTING INSERT FOR CHIP FORMING MACHINING

[75] Inventor: Kaj-Ragnar Loqvist, Fagersta, Sweden

[73] Assignee: Seco Tools AB, Fagersta, Sweden

[21] Appl. No.: 882,516

[22] Filed: Jul. 7, 1986

[30] Foreign Application Priority Data

Jul. 9, 1985 [SE] Sweden ............................ 8503397

[51] Int. Cl.[4] ........................................... B23B 27/22
[52] U.S. Cl. ................................... 407/114; 407/116
[58] Field of Search ................ 407/113, 114, 115, 116

[56] References Cited

U.S. PATENT DOCUMENTS

| | | | |
|---|---|---|---|
| 3,395,434 | 8/1968 | Wirfelt | 407/114 |
| 3,875,663 | 4/1975 | Gustafson et al. | 407/114 |
| 3,885,281 | 5/1975 | Stambler | 407/114 |
| 3,973,308 | 8/1976 | Lundgren | 407/116 |
| 4,215,957 | 8/1980 | Holma et al. | 407/114 |
| 4,273,480 | 6/1981 | Shirai et al. | 407/114 |
| 4,335,984 | 6/1982 | Zweekly | 407/114 |
| 4,367,990 | 1/1983 | Porat et al. | 407/114 |
| 4,447,175 | 5/1984 | Warren | 407/114 |

FOREIGN PATENT DOCUMENTS 1105  1/1984  Japan .................................. 407/114

*Primary Examiner*—M. Jordan
*Assistant Examiner*—Jerry Kearns
*Attorney, Agent, or Firm*—Burns, Doane, Swecker & Mathis

[57] ABSTRACT

A cutting insert (20) for chip forming machining has at least one cutting edge (21) created by the transition between an upper face (22) and a side face (23) of the cutting insert (20), said upper face (20) being a rake face and the side face (23) being a flank. The rake face comprises a chip upsetting face arranged adjacent to the cutting edge (21) and a curved chip breaking face (25) arranged adjacent to the chip upsetting face (24). A number of mutually separated along and inside of the cutting edge (21) located depressions (27) are arranged to bridge a border line (26) between the chip upsetting face (24) and the chip breaking face (25).

14 Claims, 9 Drawing Figures

CUTTING INSERT FOR CHIP FORMING MACHINING

BACKGROUND OF THE INVENTION

The present invention relates to a cutting insert for chip forming machining of preferably metallic work pieces, said cutting insert having at least one cutting edge created by the transition between an upper face and a side face of the cutting insert, said upper face constituting a rake face or contact face between the cutting insert and the chip formed during machining and said side face constitutes a flank, and that the rake face comprises a chip upsetting face arranged adjacent to the cutting edge and a curved chip breaking face arranged adjacent to the chip upsetting face.

During use of conventional cutting inserts of this type the formed chip contacts the cutting insert in the chip upsetting face, said chip is furnished with its characteristic lamination and that said chip emits a part of its heat to the cutting insert. Then the chip is bent and formed to an easily handled breakable chip along the chip breaking face. The lamination and chip forming is thus carried out in two timely separated steps.

The present invention intends to deform the chip in three steps in quick running in order to decrease the cutting force.

THE DRAWINGS

The invention is described in detail in the following with reference to the enclosed drawings disclosing different embodiments as a way of example. These embodiments are only intended to illustrate the invention that can be modified within the scope of the patent claims.

In the drawings

DESCRIPTION OF PREFERRED EMBODIMENTS OF THE INVENTION

Figure 1:
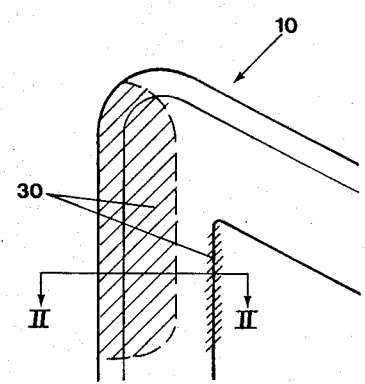
FIG. 1 shows a top view of a cutting insert with conventional design of the chip upsetting and the chip breaking face.
Figure 2:
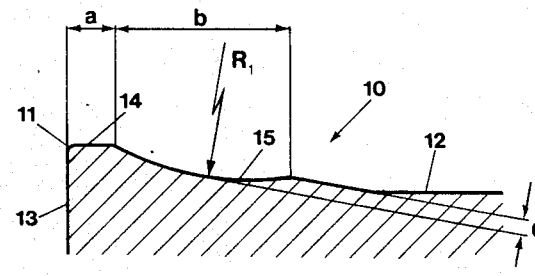
FIG. 2 shows a section along the line II—II in FIG. 1.

The conventional cutting insert 10 disclosed in FIGS. 1 and 2 has a cutting edge 11 that is created by the transition between an upper face 12 and side face 13 of the cutting insert. The upper face 12 constitutes the rake face or contact face between the insert and the chip formed during machining and the side face 13 consitutes a flank. The rake face 12 comprises a chip upsetting face 14 arranged in connection with the cutting edge 11 and a curved chip breaking face 15 arranged in connection with the chip upsetting face 14. When the chip disengages the work piece it slides along the chip upsetting face 14, the extension a of said face perpendicular to the cutting edge 11 being in the range of 0.4 mm. Then the chip follows the chip breaking face 15, the chip being formed substantially in conformity to the radius of curvature $R_1$ of the chip breaking face 15, said radius of curvature being in the range of 5 mm. The extension b of the face 15 perpendicular to the cutting edge 11 is in the range of 2 mm. The depth c of the chip breaking face 15 is in the range of 0.5 mm. As can be understood from what is said above, the deformation of the chip, i.e., the lamination and the curving of the chip is carried out in two time separated steps, said chip breaking work being relatively energy absorbing.

Figure 3:
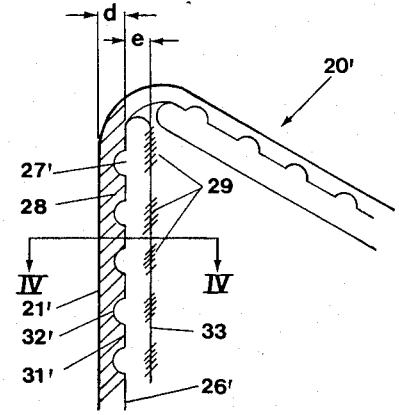
FIG. 3 shows a top view of an embodiment of a cutting insert according to the invention.
Figure 4:
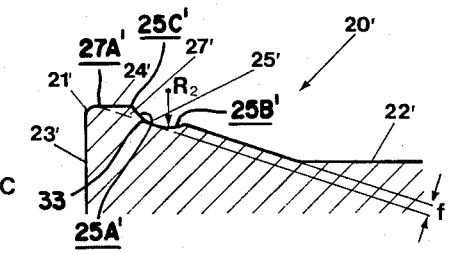
FIG. 4 shows a section along the line IV—IV in FIG. 3.

In the embodiment of FIGS. 3 and 4 disclosing a cutting insert 20' according to the invention, said insert 20', like the insert 10, being provided with a cutting edge 21' at the transition between an upper face 22' and a side face 23'. The upper face or the rake face 22' comprises a chip upsetting face 24' and a curved chip breaking face 25'. The chip breaking face includes a first portion 25A' which extends curvalinearly rearwardly downwardly from the upsetting face 24', and a second portion 25B' which extends curvalinearly rearwardly upwardly from a rear end 33 of the first portion.

Between the chip upsetting face 24' and the chip breaking face 25' there is a border line 26'. This border line is to be understood as a straight line that connects the points of the chip forming face 24' that are located farthest from the cutting edge. According to the invention a number of depressions or recesses 27' are arranged to bridge the border line 26'. The depressions 27' are located inside of the cutting edge 21', i.e., they do not reach the cutting edge 21'. A first end 25C' of the first portion 25A' is disposed closer to the cutting edge than are rear ends of the depressions, which rear ends of the depressions correspond to the rear end 33 of the first portion 25A'. The front end 25C' is disposed farther from the cutting edge than are front ends 27A' of the depressions, and are mutually separated along the cutting edge 21'.

The extension d of the chip upsetting surface 24' perpendicular to the cutting edge 21' between said edge and the border line 26' is of the same magnitude as the extension a in FIG. 2, i e in the range of 0.4 mm. The radius of curvature $R_2$ for the chip breaking face 25' is however essentially smaller than the radius of curvature $R_1$ in FIG. 2, the radius $R_2$ being in the range of 0.5 mm.

The extension e of the face 25' perpendicular to the cutting edge 21' and its depth f is also essentially smaller than the extension b and the depth c, respectively in FIG. 2, the extension e being in the range of 0.2–0.4 mm and the depth f in the range of 0.04–0.05 mm.

At a cutting insert according to FIGS. 3 and 4 the creation of the lamination takes place when the chip disengages from the working piece and slides along the face 24'. Simultaneously an upset of the chip takes place due to the recesses 27' and runners or beads are created on the lower side of the chip. This friction working of the chip increases its temperature and the deformation of the chip is facilitated. These runners also give rise to a small friction area between the chip and the rake face. This friction area, having reference numerals 28, 29 in FIG. 3, is to be compared to the friction area having reference numeral 30 in FIG. 1, said area being achieved at a cutting insert of conventional design. The decreased friction area is contributing to the increase of the temperature of the chip and thus to further facilitate the deformation of the chip.

Due to the fact that the extension e of the chip breaking area 25' is essentially smaller than the extension b of said area at a conventional cutting insert the chip forming is carried out essentially faster than with a conventional cutting insert. With a cutting insert according to the present invention the lamination, creation of runners and the chip forming are happening in quick succession or essentially simultaneously and approximately in half the time required by lamination alone with a conventional cutting insert. In spite of the fact that the chip very fast loses its high temperature the deformation work is very low and consequently the cutting forces become low due to the fact that the three-step deformation of the chip takes place essentially simultaneously.

As can be learnt from FIG. 3 the border line 26' is constituted by a broken line having portions 31' that are parallel to the cutting edge 21'. Due to the recesses 27' the portions 31' are separated by curved portions 32' having their center of curvature located at the side of the portions 32' that are directed from the cutting edge 21'.

The recesses 27' have an extension adjacent to the rear portion of the chip breaking surface 25. In a preferred embodiment the recesses 27' extend up to the rear border line 33 of the chip breaking face 25'. Said border line 33 is to be understood as a straight line that connects the points on the chip breaking face 25' that are located farthest from the cutting edge 21'.

As can be seen from FIG. 4 the bottom surfaces of the recesses 27' substantially coincide with the bottom surface of chip breaking face 25' at the portions of the bottom surfaces adjacent to the border line 33. The curvature of the chip breaking face 25' has a constant radius of curvature $R_2$ and is consequently smaller than the radius of curvature of the portions of the recesses 27' adjacent to the cutting edge 21'.

Figure 5:
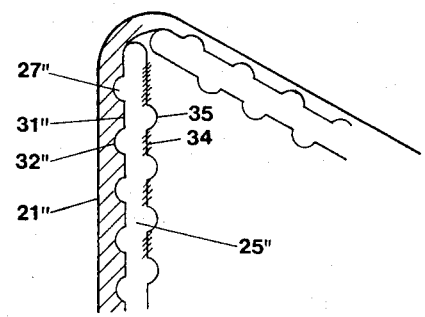
FIG. 5 shows a top view of another embodiment of a cutting insert according to the invention.

The embodiment disclosed in FIG. 5 corresponds to the embodiment of FIGS. 3 and 4 with the exception that the chip breaking face 25'' at the side directed from the cutting edge 21' is restricted by a line having alternating straight portions 34 parallel to the cutting edge and curved portions 35 having their center of curvature located at the side of the portions 35 directed to the cutting edge 21''. The curved portions 32'' are arranged opposite to the portions 34 and the straight portions 31'' opposite to the portions 35. In the preferred embodiment the extension of one of the portions 32'' in the longitudinal direction of the cutting edge 21'' is smaller than the extension of one of the portions 34 in this longitudinal direction.

Figure 6:
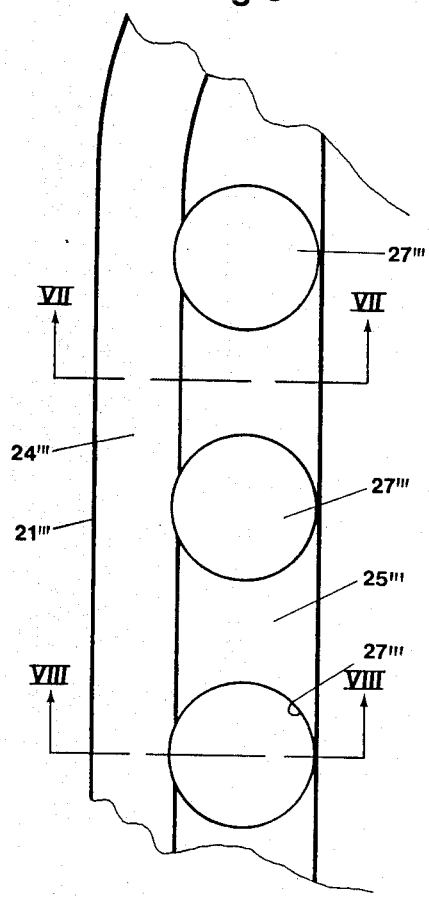
FIG. 6 shows a top view of a further embodiment of a cutting insert according to the invention.
Figure 7:
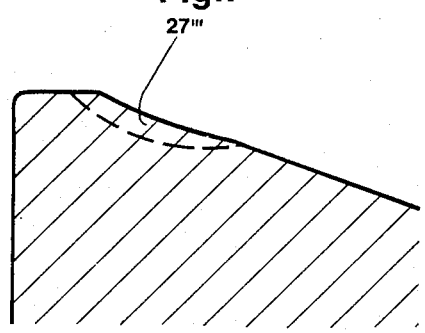
FIG. 7 shows a section along the line VII—VII in FIG. 6.
Figure 8:
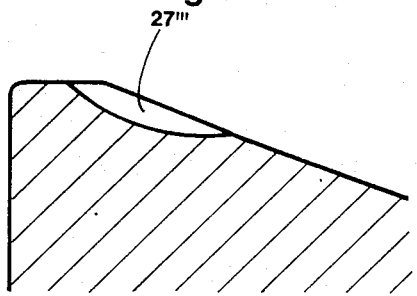
FIG. 8 shows a section along the line VIII—VIII in FIG. 6.

In the embodiment of FIGS. 6–8 a number of recesses 27''' are arranged along the cutting edge 21'''. In this embodiment the radius of curvature of the chip breaking face 25''' is essentially greater than the curvature of the recesses 27'''. The bottom surface of the recesses 27''' are thus completely below the bottom surface of the face 25''', said recesses have a border line against the chip upsetting face 24''' and the chip breaking face 25''' along the whole circumference, said border line being circular in the disclosed embodiment.

Figure 9:
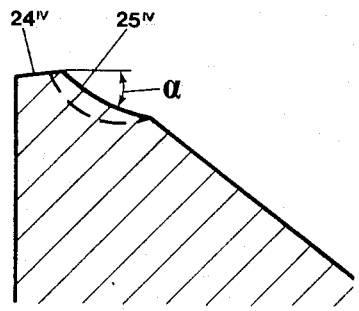
FIG. 9 shows in section still a further embodiment of a cutting insert according to the invention.

The embodiment of FIG. 9 corresponds in principal with the embodiment of FIGS. 6–8 with exception for that the rake angle α has been increased, thus somewhat further decreasing the cutting forces.

The general concept for carrying out the above described three-step deformation is that the depth f of the recesses 27 must be smaller than 0.3 mm. Preferably the depth is smaller than 0.1 mm with preference for values in the range of 0.04–0.05 mm. The chip upsetting face 24 and the chip breaking face 25 have a total extension d+e from the cutting edge of less than 2 mm. Preferably the extension should be less than 1 mm with preference for values in the range of 0.6 mm–0.8 mm. The extension e of the chip breaking face perpendicular to the cutting edge 21 shall be less than 0.8 mm, preferably in the range of 0.2–0.4 mm. The radius of curvature $R_2$ for the chip breaking face 25 shall be less than 5 mm. Preferably the radius of curvature shall be less than 2 mm with preference for values in the range of 0.5 mm.

I claim

1. A cutting insert for chip-forming machining of workpieces, said insert including an upper face defining a rake face, and a side face intersecting said rake face to form a cutting edge for cutting chips from a workpiece; said rake face including an upsetting face extending rearwardly from said cutting edge, a curved chip breaking face including a first portion extending curvilinearly rearwardly downwardly from said upsetting face, and a second portion extending curvilinearly rearwardly upwardly from a rear end of said first portion; said rake face further including a plurality of depressions spaced apart in a direction parallel to said cutting edge and intersecting both said upsetting face and said chip breaking face, said depressions defining chip working means for working and heating chips as portions thereof enter said depressions; a front end of said first portion of said chip breaking face disposed closer to said cutting edge than are rear ends of said depressions and farther from said cutting edge than are front ends of said depressions such that the chips are simultaneously bent by said chip breaking surface and heated by the working in said depressions.

2. A cutting insert according to claim 1, wherein said chip breaker face intersects said upsetting face along a line which extends parallel to said cutting edge and which is interrupted intermittently by said depressions.

3. A cutting insert according to claim 1, wherein rear ends of said depressions coincide with a front end of said second portion of said chip breaking face.

4. A cutting insert according to claim 1, wherein said depressions include a depth less than 0.3 mm.

5. A cutting insert according to claim 4, wherein said depth is less than 0.1 mm.

6. A cutting insert according to claim 5, wherein said depth is from 0.04 to 0.05 mm.

7. A cutting insert according to claim 1, wherein said chip upsetting face and said chip breaking face have a combined rearward extension from said cutting edge less than 2 mm.

8. A cutting insert according to claim 7, wherein said combined rearward extension is less than 1 mm.

9. A cutting insert according to claim 8, wherein said combined rearward extension is from 0.6 to 0.8 mm.

10. A cutting insert according to claim 9, wherein said chip breaking face includes a rearward extension less than 0.8 mm.

11. A cutting insert according to claim 10, wherein said last-named rearward extension is from 0.2 to 0.4 mm.

12. A cutting insert according to claim 1, wherein said first and second portions are concentric.

13. A cutting insert according to claim 12, wherein said first and second portions have a common radius less than 2 mm.

14. A cutting insert according to claim 13, wherein said common radius is 0.5 mm.

* * * * *